Nov. 29, 1966     M. LE ROY GOFF III, ETAL     3,288,403
PARACHUTE
Filed Feb. 26, 1965     2 Sheets-Sheet 1
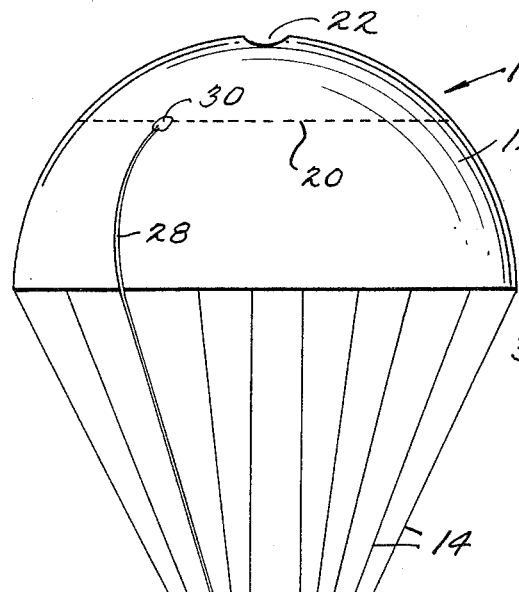
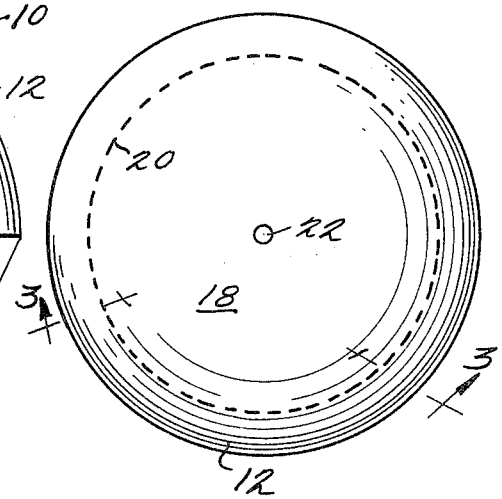
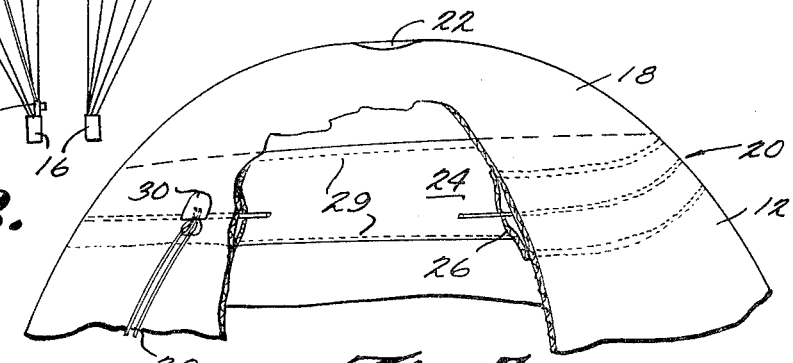
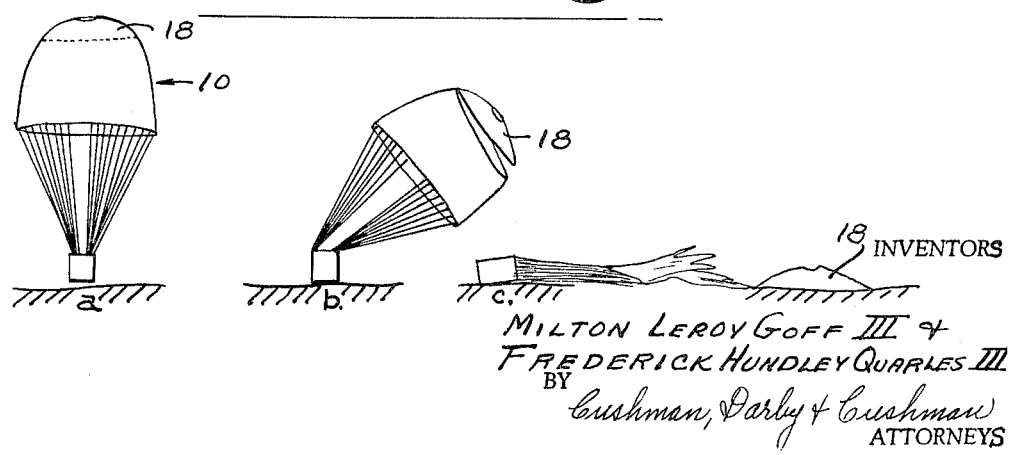
INVENTORS
MILTON LEROY GOFF III &
FREDERICK HUNDLEY QUARLES III
BY
Cushman, Darby & Cushman
ATTORNEYS Nov. 29, 1966 M. LE ROY GOFF III, ETAL 3,288,403
PARACHUTE
Filed Feb. 26, 1965 2 Sheets-Sheet 2
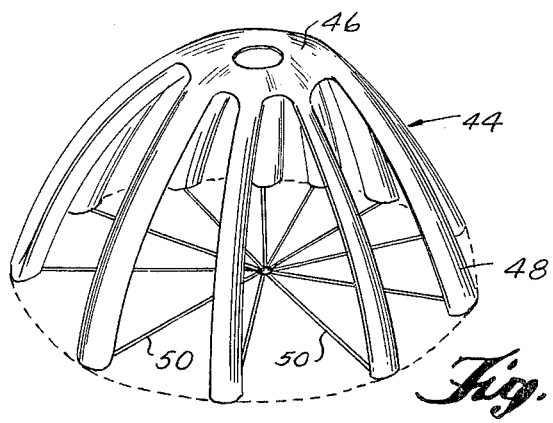
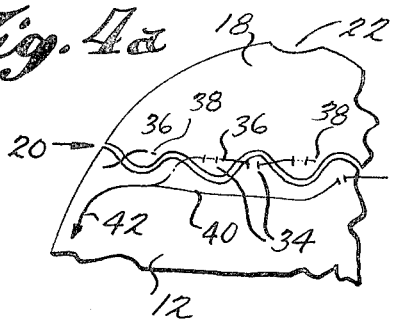
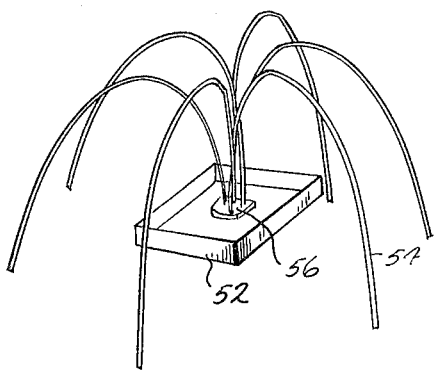
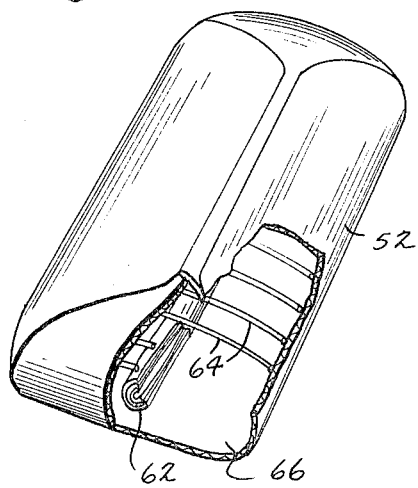
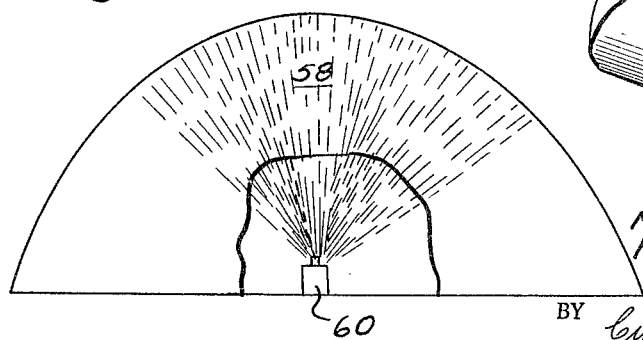
INVENTORS
MILTON LEROY GOFF III &
FREDERICK HUNDLEY QUARLES III
BY Cushman, Darby & Cushman
ATTORNEY

United States Patent Office 3,288,403
Patented Nov. 29, 1966

3,288,403
PARACHUTE
Milton LeRoy Goff III, Rte. 1, Box 26A, Scottsville, Va., and Frederick Hundley Quarles III, 2401 Fontaine Ave., Charlottesville, Va.
Filed Feb. 26, 1965, Ser. No. 435,442
4 Claims. (Cl. 244—145)

This invention relates to parachute constructions and methods which provide for a safer landing and which further provide for a survival tent after landing. In particular, this invention is concerned with a parachute construction and method which includes a portion in the parachute canopy which may be disassociated from the canopy and which may be used as a tent after separation from the main parachute.

Parachutes are well-known devices which are carried for the purpose of making emergency exits from airplanes or any airborne vehicle. Most often the emergency exit is made over hazardous terrain, and the parachutist is faced with problems of landing on the terrain and of surviving after he has landed and until he can be found by search parties. These problems may arise, for example, where a landing is made in a remote geographical area or where the terrain is rough and the climate is not suitable for long exposure upon landing. In addition to the survival problems of terrain and climate, it is a special problem to land a parachute under conditions of high wind because the parachutist must quickly deflate the canopy of his parachute upon landing in order to avoid being dragged for a distance across the ground. This problem is compounded where the terrain is rocky or rough and the winds are severe enough to drag a parachutist for a considerable distance.

The present invention contemplates a solution to these problems of landing and surviving by providing a particular parachute construction which is more easily deflated upon landing and which incorporates a survival tent to be used by the parachutist after successfully landing.

The parachute of this invention includes means for rapidly severing and disassociating an upper central portion of the parachute canopy from the remainder of the canopy. The means for severing include heating means or other separation means which may be operated by the parachutist while he is in the parachute harness and while he is making a normal landing with the parachute. These means are remotely operated by the parachutist and act to sever a substantial portion of material from the upper central area of the parachute. The severing operation may be effected just as the parachutist is landing, and thus the parachute will present less resistance to the wind and will be more easily deflated than heretofore possible.

In addition to providing for a safer and a better controlled landing, the parachute construction of this invention may also be used to produce a tent which is useful for protecting the survivor from exposure to the elements in the particular climatic region where he may find himself. The tent is formed from the same section of the parachute which is removed to facilitate the landing, and this offers the advantage of including a survival tent in existing parachute equipment and without a requirement of carrying an excessive amount of additional equipment. Various means are provided for supporting the tent on the ground after the landing, and these means include inflatable devices, or spring means, or hardening agents, all of which may be easily carried by or associated with the usual packing of a parachute. Other means will be described which are included in the original parachute structure and which provide for a tent and support for the tent. Particular packing arrangements are also provided by this invention to accommodate support means which may be separately carried and used with the tent.

Finally, this invention contemplates a treatment of a parachute with materials which will facilitate rescue operations by making the parachute detectable by devices used in search planes. The material selected to treat the parachute also provides further survival protection to the parachutist, in one form of the invention.

Other advantages of the present invention will become apparent from the more detailed discussion which follows, and for a better understanding of the present invention, reference is made to the accompanying drawings in which:

FIGURE 1 is a side elevation of a parachute constructed in accordance with this invention;

FIGURE 2 is a top view of the parachute shown in FIGURE 1 illustrating the central portion of the parachute which is removed to facilitate landing and to produce a tent;

FIGURE 3 is a perspective view taken at line 3—3 of FIGURE 2 and showing one means for providing a separation of the tent portion from the remainder of the parachute canopy;

FIGURE 4a is a side view of the top section of a parachute, showing another means for separating the tent from the remainder of the chute;

FIGURE 4b is a side view of the top section of a parachute, showing a drawstring release for separating the tent from the remainder of the parachute;

FIGURE 4c is a detail of interlocking loops and a drawstring as used in FIGURE 4b;

FIGURE 5 shows three sequential views of a landing parachute being deflated in accordance with this invention;

FIGURE 6 shows a perspective view of inflatable support means which may be used in conjunction with the tent;

FIGURE 7 shows a perspective view of spring bow means carried by a parachute pack and used for supporting the tent;

FIGURE 8 is a side view showing a hardening agent being applied to the tent; and FIGURE 9 shows a perspective view of an assembled parachute pack, with portions cut away to show the packing of support bows and poles which are used in another embodiment to support the tent.

Referring to FIGURE 1, the parachute 10 is shown as having the usual canopy 12 and a plurality of shroud lines 14 which are spaced around the outer perimeter of the canopy and which depend downwardly from the canopy when the parachute is in use. The shroud lines 14 terminate in the usual fashion and are attached to a harness 16 which supports the parachutist during his descent. The parachute canopy is constructed by known methods and may be made out of nylon fabric or any other suitable woven material. Of course, the parachute is normally carried in a folded condition in a pack mounted on the harness, and the harness and parachute pack are worn by an individual who is flying and requires the safety device of a parachute for possible emergency exits.

The canopy 12 of the parachute is provided with a central portion 18 which may be separated from the remainder of the canopy along the separation line 20. Normally, the central portion 18 is an integral part of the entire canopy and is of a design and configuration which is standard for a central dome portion of an inflated parachute canopy. This central portion may be provided with a central air vent 22 which is a standard structure in parachutes, and the parachute may include other openings or slits in the fabric for use in controlling the direction of descent as is common in modern parachute construction. Other configurations or shapes for the central portion 18 are possible, but the dome-shaped configuration shown is preferable because it permits additional structure to be associated with a removed central portion for the purpose of using the removed portion as a tent. A more detailed description of the tent structure will be set forth later in this specification.

This invention provides means for separating the central portion 18 along the separation line 20 from the remainder of canopy 12, and the separation means can be actuated remotely by the parachutist while he is still held to the parachute by the harness 16. Referring to FIGURE 3, the separation means is shown as being a string of fuses or continuous fuse material 24, or other ignitible material which is woven into, or otherwise incorporated in, the parachute canopy fabric along the separation line 20. The fuses 24 are shown in FIGURE 3 as being held in position along the separation line 20 by a separate piece of parachute fabric 26 which is attached to the parachute canopy as by sewing along the lines 29. In the FIGURE 3 embodiment, the main parachute 10 comprises a single outer piece of fabric, thus making the central portion 18 and the remainder of the canopy 12 integral with each other prior to a separation of the central portion from the remainder of the parachute.

As shown in FIGURES 1 and 3, an actuating means 28 is provided whereby the central portion 18 may be separated remotely by the parachutist while he is in the harness of the parachute. Where the separation means comprises the fuse material 24, or other ignitible material, it is preferable to provide ignition means for initially igniting the fuse material at a point along the separation line 20. In actual practice, it has been found that the fuse material 24 may be ignited by an ignition means 30 which is actuated by means of the actuating wire 28. The wire 28 may be an electrically conductive wire which is connected at its one end to the ignition means 30, and the ignition means may be a primer located at a point on the separation line 20. A switch 32 is provided on the harness, or in close proximity to the parachutist, and the wire 28 is connected at its other end to the switch. Battery means, or an inductive spark generator means (not shown) is included in circuit with the actuating wire 28 and the switch 32, so that a closing of the switch causes an electric spark to be relayed to the primer 30. Thus, the primer 30 may be ignited at will by the parachutist, and this causes the fuses 24 to ignite and burn through or melt the parachute fabric in the region of the separation line 20. A burning through of the fabric along the entire separation line permits the central portion 18 to become detached from the remainder of the canopy 12.

It has been found that the inflammable fuse material used at 24 may be gun cotton or any other material which is easily burned under varying wind and temperature conditions. Also, the ignition means 30 may be in the form of a frangible capsule which is broken by a movement of the actuating wire 28. The wire 28 may be attached to a toggle bolt which can be released to break the capsule 30, and the capsule may contain a chemical, such as phosphorus, which ignites upon exposure to air. Additionally, it is contemplated that the ignition means 30 may be in the form of a mechanical sparking device which is actuated by the wire 28 to produce sparks for igniting the fuse material 24.

In an alternative construction, separation of the central portion 18 along the separation line 20 is effected by weaving into the parachute fabric, or otherwise attaching, a high resistance wire along the desired separation line. The high resistance wire is of such an electrical resistance that a high, burning temperature is created when electric current flows through the wire. The electric current may be relayed to the high resistance wire upon actuation of the manually operated switch 32, as described above, and the heating of the high resistance wire causes the parachute fabric to burn or to melt along the separation line 20.

FIGURE 4a shows an embodiment of this invention whereby the central portion 18 is formed separately from the remainder of the parachute canopy 12, and the two parts 18 and 12 of the parachute are mated along the line 20 by interdigitating projections 34 which project outwardly at the point of juncture of the two parachute parts. The central portion 18 is held in mating relationship to the remainder of the canopy 12 by short threads or wires 36 which pass through adjoining projections 34 in a manner which holds the projections in interdigitating relationship. The short wires 36 are positioned along the entire separation line 20, and each short wire has a free end which permits the wire to be withdrawn from the projections 34. The ends of the short wires 36 opposite to the free ends 38 are attached at points 40 to a common pull wire 42. Thus, when the pull wire 42 is actuated, as by pulling on the actuating wire 28, the short wires 36 are all drawn from the projections, and the central portion 18 is released from the remainder of the canopy 12.

FIGURE 4b shows another form of canopy construction whereby a central portion 18 may be released by withdrawing the drawstring or wire 42. In this embodiment two separate rows of wire or nylon fiber loops 35 are placed in opposed relationship along the line of separation 20 so that looped portions extend into the separation area and overlap as shown. The base part of each looped section is sewed or affixed to the material of the canopy as at 37 in the exploded view of FIGURE 4b. The overlapped loops are prevented from separating by the wire 42 which passes through each overlapped pair of loops. Upon withdrawal of the wire 42 the loops may separate, and the central portion is free to separate from the remainder of the canopy. The use of rows of looped wire or string gives the parachute canopy greater resilience when initially inflated, and there is less likelihood of the central portion 18 tearing away from the remainder of the canopy prematurely.

In operation, it can be seen in the sequential views a-c of FIGURE 5 that the separation of the central portion 18 can be effected by the parachutist during or after landing, as desired. Where the landing is over rough terrain and there are high wind conditions, it is desirable to deflate the parachute as quickly as possible upon landing to avoid a dragging of the parachutist across the terrain. With the parachute of this invention, a better method of deflating is provided by a separating of the central portion 18 and thereby substantially reducing the resistance of the parachute to wind and air currents. As shown in FIGURE 5, the parachutist may initially actuate the separation means just before he touches the ground.

Where the separation is effected by a burning action, such as was described for the FIGURE 3 embodiment, it can be seen that the central portion 18 is not removed all at once. Instead, the separation begins at a point on the separation line where the ignition means is located, and the burning action then progresses in both directions from that point and around the entire separation line. Thus, there is allowed a partial wind spillage at the beginning of the separation, and this partial spillage may be initiated while the parachutist is still descending and just before touching down. Upon landing, a complete separation of the central portion is effected and the parachute is quickly deflated, thereby providing a safer landing than heretofore possible.

Where the separation is effected all at once, as by the draw wire described for FIGURES 4a, 4b, 4c, it will be appreciated that separation will be actuated by the parachutist only after landing.

The shape and size of the removable central portion 18 and the opening which its removal forms in the parachute may be varied to provide for particular wind resistance characteristics or for particular control characteristics of a descending, inflated parachute, and it is also contemplated that more than one opening may be made in the parachute by the separation means already described. It is preferred, however, to separate a central dome-shaped portion of the parachute, as shown in the drawings, so that the removed portion may be utilized as a tent by the parachutist upon landing.

The tent which is formed by the removed central portion 18 may be supported on the ground as an igloo-like habitat by support means which are integral with the original parachute consrtuction or by separate support means which are carried in the parachute pack by the parachutist.

Referring to FIGURE 6, an inflatable support structure 44 is shown which includes a hollow dome section 46 and hollow arcuate arms 48 which are interconnected with and extending radially outwardly from the dome section 46. The inflatable structure 44 may be made from rubberized canvas, rubberized nylon, or any other material capable of being inflated into the form shown. The entire inflatable support 44 may be formed integrally with the original parachute 10, as by sewing or attaching the inflatable structure to the central portion 18 of the parachute 10. The inflatable structure 44 is preferably attached in deflated condition to the concave interior of the inflated parachute as viewed in FIGURE 1, but it may be attached to the exterior of the central portion 18, as well. Alternatively, the inflatable support 44 may be carried separately by the parachutist in a deflated condition, and then inserted beneath the removed tent portion 18, and inflated to the supporting position shown in FIGURE 6. The dotted line in FIGURE 6 represents the position of the lower periphery of the tent when in place over the inflated support 44. Of course, the dome section 46 of the support 44 is of a size and shape to be fitted in the dome-shaped center of the tent 18. Tie lines 50 may be provided to better position and hold in place the lower extremities of opposed arcuate arms 48 in the manner shown in FIGURE 6. Suitable inflation means are provided, and these include hand-operated pumps or compressed gas in cylinders, and the air or gas is pumped into the inflatable support through any suitable valve (not shown). Where the inflatable support structure is an integral part of the original parachute, it has been found preferable to provide for an inflation of the support during the descent of the parachute. This is accomplished by connecting a manually operated pull cord to a frangible compressed air capsule. A release of the cord may be caused to break the capsule and to inject air directly into the inflatable support. When air is carried in a compressed gas cylinder (such as the pilot's oxygen bailout bottle), a suitable puncturing device may be actuated to puncture the valve in the bottle and release air directly into a tube leading to the inflatable support structure. Also, a one-way valve may be incorporated in the support structure to receive air during the normal descent of the parachute, and this causes the support 44 to be inflated by the flow of air through the one-way valve during descent. It is also contemplated that a chemical foam may be injected into the inflatable support, and where the foam is of the type that hardens to an essentially rigid structure, adequate support for the tent will be provided.

Additional support means for the tent portion 18 are shown in FIGURES 7, 8, and 9. In the FIGURE 7 embodiment an opened parachute pack 52 is positioned in the center floor area where the tent is to be located. The parachute pack 52 is the usual parachute pack which contains a parachute in a folded condition prior to use. Included in the pack 52 are fiber glass support bows 54, which are carried in a coiled or bent condition until needed for use. Each of the bows 54 is attached at one of its ends to a rigid member 56 contained within and attached to the pack. The unattached ends of the bows are free to assume positions around the lower periphery of the tent and may be attached to the lower edge of the tent or left free, as required. The fiber glass bows are pre-stressed to assume the arched configuration shown when released from their coiled state from within the parachute pack.

The FIGURE 8 embodiment illustrates the use of a chemical hardening agent 58 to rigidify the material of the central portion 18 which is to be used as a tent. The hardening agent may be any chemical coating composition which quickly dries and hardens upon exposure to air, and such agents include lacquers and organic resinous plastic hardening material, such as certain acrylic resins.

Preferably, the hardening agent is sprayed onto the interior surfaces of the tent from a pressurized container 60 which is included in the construction of the parachute. The hardening agent may be released into the interior of the tent after landing, as shown, but it is preferable to provide for a syraying of and rigidification of the central portion 18 during the descent of the parachutist in order that the tent portion will harden into the correct configuration. The pressurized container 60 may be suitably suspended at a point approximately equidistant from all points of interior wall of the central portion 18, and an actuating wire is provided to actuate a release valve in the pressurized container, thus releasing the hardening agent onto the interior of the central portion 18.

FIGURE 9 shows a parachute pack 52 in folded condition with a telescoping center pole 62 and connectable bow elements 64 placed against the back wall 66 of the pack. The folded parachute is omitted from the drawing, for clarity but the folded parachute would normally lie over the center pole 62 and the bow elements 64. In packing the parachute pack, it is important that the bow elements 64 be flexed over the center pole 62, as shown, so that when the pack is opened for release of the parachute, the bow elements will assist in ejecting the parachute therefrom. Suitable fastening means are provided to temporarily retain the center pole and bow elements within the pack itself until a landing is completed. Such means include fasteners or tape affixed to strategic portions of the various elements. Also, when the spring bow member 54 of the FIGURE 7 embodiment is utilized in the pack, it is preferable to so arrange or coil those members that they likewise assist in the ejection of the parachute from the pack. Thus, it can be seen that an efficient and novel packing of survival gear is included with the usual parachute pack, and the packing aids in the ejection of a parachute from the pack.

In addition to the tent support means described above, it is also possible to utilize a wire mesh having a geodesic dome pattern and configuration. Such a wire mesh could include articulations at the points of juncture of the wires making up the pattern, and the entire unit could be collapsed for carrying by the parachutist. In place of articulations, the mesh could be made from wire which can be easily flexed and bent to the desired geodesic pattern for supporting the tent.

A further feature of the invention is directed to the use of various chemical coatings to aid in the discovery of a down parachutist by air rescue methods. For example, radioactive coatings may be sprayed on the tent portion of the parachute to permit aerial scintillometric detection or the like under adverse visual conditions. Such coatings may include luminescent-phosphorescent paint compositions which can be visually detected at night. Alternately, a coating material may be applied for providing infra-red heat emission. This latter coating permits detection of the downed parachutist by aerial rescue teams using infrared photographic detection, and suitable materials for such a coating include organic pyrophoric materials which develop heat upon oxidation. An example of an inorganic material which develops heat (short of ignition) is finely powdered titanium. Additionally, certain dessicants may be used, such as phosphorus pentoxide, which produce heat upon absorption of moisture to produce hydrates. The various coating materials may be applied at the time of manufacturing the parachute, or by the parachutist at the time of being downed. The coatings may be carried in pressurized containers which are carried by personnel as part of the usual flying survival gear.

Although the invention has been described with reference to emergency landings under adverse conditions and for survival after such emergency landings, it is contemplated that the invention is also valuable to sky divers and other sport parachutists. For example, the removable portion of the parachute may be of a smaller size and of a different configuration so that a release of the removable portion permits control of the descent in a desired direction. Such a removable portion would have to be small enough to allow substantial wind resistance to remain in the main parachute body after the portion is removed, and the removable portion could be situated in a particular area of the parachute body so that spillage of air through the opening formed would permit a "steering" of the parachute descent. Where the invention is so utilized for sport parachuting, it may be preferable to use the release arrangement shown in the FIGURE 4a, 4b and 4c embodiments so that the removed portion can be recovered and reattached to the main parachute body for ultimate reuse.

Having thus described the invention, it is apparent that many changes will become obvious to those skilled in the art, and such changes are within the scope of the invention.

What is claimed is:

1. In a parachute having a canopy and a plurality of shroud lines depending from said parachute, the improvement comprising:
   separation means incorporated in said canopy for separating a portion of the canopy from the remainder of the parachute, wherein said separation means comprises ignitable material incorporated in said canopy along a line of separation between the portion to be removed and the remainder of the parachute, and
   actuating means connected to said separation means for effecting the separation of a portion of the canopy from the remainder of the parachute, wherein said actuating means includes a chemical means which ignites upon exposure to air, said chemical means being exposed to air only upon actuation of said actuating means.

2. In a parachute having a canopy, a plurality of shroud lines depending from said parachute, and a harness for a parachutist carried by and depending from said shroud lines, the improvement comprising:
   separation means incorporated in said canopy for separating a portion of the canopy from the remainder of the parachute, wherein said separation means comprises ignitable material incorporated in said canopy along the line of separation between the central portion to be removed and the remainder of the parachute, and
   remote control actuating means associated with said harness and connected to said separation means whereby the parachutist can separate the central portion of the canopy from the remainder of the parachute upon actuating the remote control actuating means, wherein said actuating means includes a chemical means which ignites upon exposure to air, said chemical means being exposed to air only upon actuation of said actuating means.

3. In a parachute having a canopy which inflates in use to a dome-shaped configuration, the improvement comprising:
   a tent portion connected to said canopy but separable therefrom, said tent portion including support means for supporting said portion as a tent or shelter when it is separated from the canopy, wherein said support means comprises a chemical hardening agent applied to said tent from a dispenser carried by said tent,
   separation means incorporated in said canopy for separating said tent portion from the remainder of said canopy, and
   actuating means controlled by a parachutist using said parachute for effecting the separation of the tent portion from the remainder of the canopy.

4. In a parachute having a canopy which inflates in use to a dome-shaped configuration, the improvement comprising:
   support means integral with said canopy for supporting said parachute as a tent or shelter upon landing wherein said support means comprises a chemical hardening agent applied to said parachute from a dispenser carried by said parachute.

References Cited by the Examiner

UNITED STATES PATENTS

| | | | |
|---|---|---|---|
| 1,678,537 | 7/1928 | Schonbrun | 244—146 |
| 1,839,441 | 1/1932 | Rockoff | 244—142 |
| 2,432,920 | 12/1947 | McKay et al. | 244—142 X |
| 3,104,612 | 9/1963 | Knacke et al. | 244—145 X |

FOREIGN PATENTS 697,165 10/1940 Germany.

MILTON BUCHLER, *Primary Examiner.*

ALFRED E. CORRIGAN, *Examiner.*